(12) United States Patent
Kim

(10) Patent No.: US 8,364,872 B2
(45) Date of Patent: Jan. 29, 2013

(54) SLAVE AND COMMUNICATING METHOD BETWEEN A MASTER AND THE SAME

(75) Inventor: Chan-Woo Kim, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 301 days.

(21) Appl. No.: 12/647,507

(22) Filed: Dec. 27, 2009

(65) Prior Publication Data
US 2010/0169526 A1  Jul. 1, 2010

(30) Foreign Application Priority Data
Dec. 30, 2008  (KR) .................. 10-2008-0136377

(51) Int. Cl.
*G06F 13/00* (2006.01)
*G06F 3/00* (2006.01)

(52) U.S. Cl. ........... 710/110; 710/29; 710/107; 710/109

(58) Field of Classification Search .................. 710/110
See application file for complete search history.

(56) References Cited

U.S. PATENT DOCUMENTS

| | | | | |
|---|---|---|---|---|
| 5,309,567 A * | 5/1994 | Mizukami | | 710/110 |
| 5,448,703 A * | 9/1995 | Amini et al. | | 710/110 |
| 7,088,371 B2 * | 8/2006 | Lippincott | | 345/573 |
| 7,257,656 B1 * | 8/2007 | Culca | | 710/106 |
| 7,308,516 B2 * | 12/2007 | Dressen et al. | | 710/110 |
| 7,366,809 B2 * | 4/2008 | Saripalli et al. | | 710/110 |
| 7,562,171 B2 * | 7/2009 | Daly et al. | | 710/110 |
| 8,006,106 B2 * | 8/2011 | Sun | | 713/300 |
| 2011/0029705 A1 * | 2/2011 | Evans | | 710/110 |

OTHER PUBLICATIONS

Microchip—"Interfacing I2C Serial EEPROMs to PIC10 and PIC12 Devices"; 18 pages, Dates 2005.*
"The I2C—Bus Specification Version 2.1"—46 pages, Dates Jan. 2000.*

* cited by examiner

*Primary Examiner* — Brian Misiura
(74) *Attorney, Agent, or Firm* — Sherr & Jiang, PLLC

(57) ABSTRACT

A slave and a communicating method between a slave and a master that includes checking whether the command to be sent is one of a write command and a read-out command if the master attempts to send a command to the slave, determining whether a processing of a previous command sent by the master is entirely completed if the command to be sent is the write command, and sending an acknowledgement signal that allows a transfer of the command to the master if the processing of the previously sent command is determined as one of entirely completed and the command to be sent is determined as the read-out command. The master sends the command to the slave in response to the acknowledgement signal sent by the slave.

20 Claims, 3 Drawing Sheets

SLAVE AND COMMUNICATING METHOD BETWEEN A MASTER AND THE SAME

Figure 1:
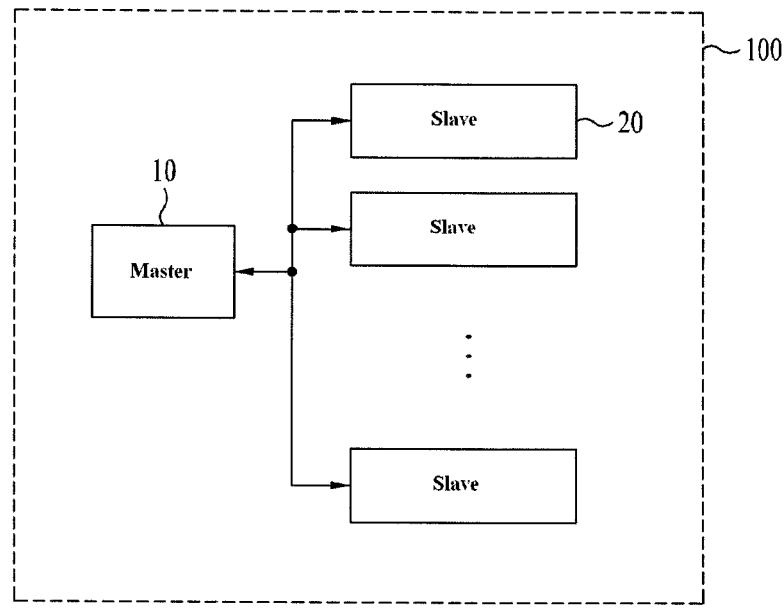

The present application claims priority under 35 U.S.C. §119 to Korean Patent Application No. 10-2008-0136377 (filed on Dec. 30, 2008), which is hereby incorporated by reference in its entirety.

BACKGROUND

Generally, through a serial bus communication protocol called I2C, a command delivery from a master provided to a host system to a slave loaded with a microcontroller unit is performed. In this case, the host system uses polling to check whether the slave has completed the processing of a previous command. If a command having been delivered to the slave from the master through I2C is still being processed, the slave makes a response in a manner of sending a non-acknowledgment signal (NAK) to the master. On the contrary, if the processing of the previous command is completed, the slave makes a response in a manner of sending an acknowledgement signal (ACK) to the master through the I2C. Therefore, the master is able to determine whether the processing for the previous command is completed by the slave using the ACK signal or the NAK signal.

The host waits until the I2C communication enters a normal state, i.e., until the ACK signal is sent from the slave. If the ACK signal is sent to the host from the slave by the I2C communication, the host is able to deliver a command to the slave. Accordingly, if the slave is processing a previous command, the slave sends NAK to the master unconditionally. However, even if a command the master attempts to send is not a write command but a read command, NAK is sent to the master. Hence, the master is unable to read data from the slave.

SUMMARY

Embodiments relate to a data communication, and more particularly, to a slave and communicating method between a master and the same. Although embodiments are suitable for a wide scope of applications, they are particularly suitable for the data communication including signals.

Embodiments relate to a slave and communicating method between a master and the same thereof by which the master is synchronized more efficiently and precisely to be accessible to the slave.

In accordance with embodiments, a slave which communicates with a master in accordance with a serial bus communication protocol can include at least one of the following: a central processing unit that generates an acknowledgement signal (ACK) for allowing a transfer of the command if the master attempts to send a command, the ACK being sent in accordance with a result of checking whether the command to be transmitted is a write command or a read-out command and a result of checking whether a processing of a previous command previously sent by the master is entirely completed and a storage unit storing a written or read-out data under control of the central processing unit, such that the master sends the command to the slave in response to the acknowledgement signal transferred from the slave.

In accordance with embodiments, a communicating method between a slave and a master which are able to communicate with each other in accordance with a serial bus communication protocol, can include at least one of the following: checking, if the master attempts to send a command to the slave, whether the command to be sent is a write command or a read-out command, determining, if the command to be sent is checked as the write command, whether a processing of a previous command previously sent by the master is entirely completed, and then sending, if the processing of the previously sent command is determined as entirely completed or the command to be sent is determined as the read-out command, an acknowledgement signal allowing a transfer of the command to the master such that the master sends the command to the slave in response to the acknowledgement signal sent by the slave.

DRAWINGS

Example FIGS. 1 to 5 illustrate slave, a communicating method between a slave and a master, in accordance with embodiments.

DESCRIPTION

Reference will now be made in detail to embodiments, examples of which are illustrated in the accompanying drawings. Wherever possible, the same reference numbers will be used throughout the drawings to refer to the same or like parts.

Example FIG. 1 is a diagram for a schematic and connection relation between master 10 and slave 20.

As illustrated in example FIG. 1, master 10 communicates with slave 20 in accordance with I2C communication protocol and can be included in a host system. A device including master 10 and slave 20 can be an image signal processor for example. Master 10 transfers such data as a command, a control signal and the like to slave 20. Hence, slave 20 is enabled to write the data or master 10 is able to read out and bring the data stored in slave 20.

Figure 2:
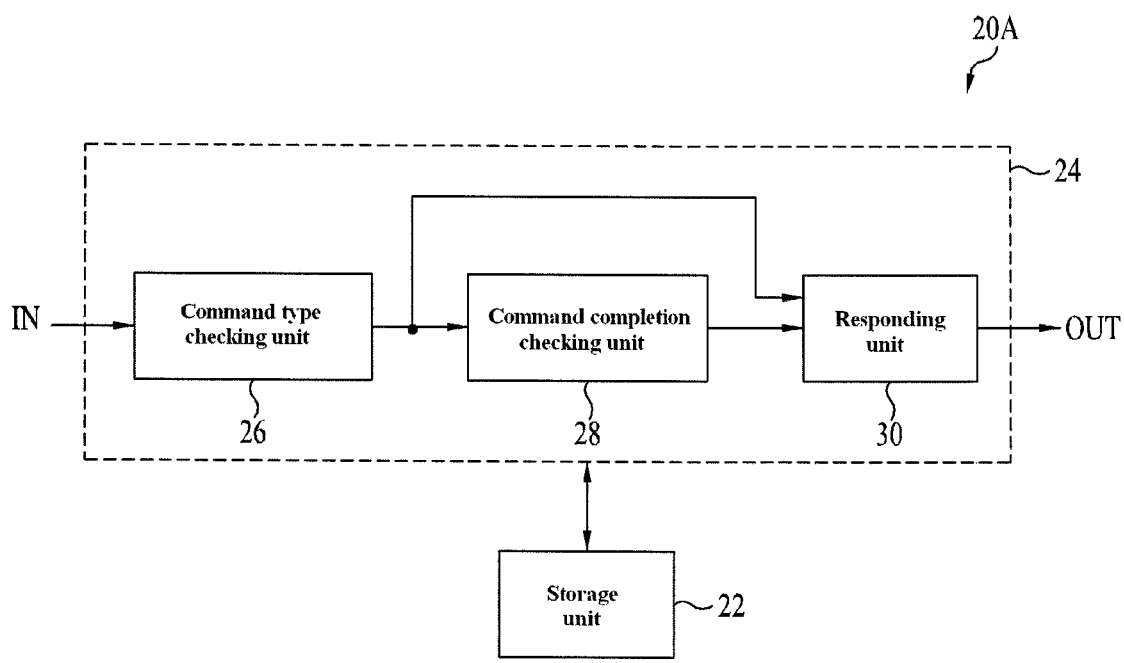

Example FIG. 2 is a block diagram of slave 20 illustrated in example FIG. 1 in accordance with embodiments.

As illustrated in example FIG. 2, slave 20A in accordance with embodiments can include central processing unit 24 and storage unit 22. Central processing unit 24 is a device having a micro control unit (MCU). If master 10 attempts to send a command, central processing unit 24 checks whether the command is a write command or a read-out command. Central processing unit 24 checks whether the processing of a previous command given by master 10 has been completely performed. In accordance with the check results, central processing unit 24 generates an acknowledgement signal (ACK) indicating that master 10 is allowed to send a command to slave 20 and then sends the generated acknowledgement signal (ACK) to master 10.

In accordance with embodiments, central processing unit 24 includes command type checking unit 26, command completion checking unit 28 and responding unit 30. Command type checking unit 26 checks whether a command master 10 attempts to send is a write command or a read-out command and then outputs the check result as a first check signal to command completion checking unit 28 and responding unit 30. In response to the first check signal received from command type checking unit 26, command completion checking unit 28 checks whether the processing of a previous command master 10 have sent to the slave is completely performed and then outputs the check result as a second check signal to responding unit 30.

In response to at least one of the first and second check signals, responding unit 30 generates an ACK signal and then transfers it to master 10 via an output terminal OUT. Master 10 is able to send a command to slave 2 in response to the ACK signal transferred from slave 20. Yet, responding unit 30 generates a non-acknowledgment (NAK) signal indicating that master 10 should not send a command to slave 20 yet in response to the first and second check signals and then sends the generated NAK signal to master 10. Having received the NAK signal, master 10 holds a transfer of the command to send until an ACK signal is received from slave 20.

Responding unit 30 of central processing unit 24 is able to send a flag type ACK or NAK signal to master 10. For instance, assuming that this flag is defined as a NAK flag, if a command is received from master 10 in accordance with I2C or a stop signal described in the following description is input, responding unit 20 sets a level of a NAK plug to a logic level "high." Thereafter, if an interruption of the I2C occurs, a firmware (F/W) executed in central processing unit 24 will enter an interrupt service routine (ISR). If the processing for an I2C command that should be currently handled is completely performed, the F/W sets a level of the NAK flag to a logic level "low." In particular, if the level of the NAK flag is set to the logic level "low," it means the generation of the ACK signal. Storage unit 22 is a type of buffer memory for storing the data written or read out under the control of central processing unit 24.

In the following description, a method for slave 20 illustrated in example FIG. 2 to communicate with master 10 is explained with reference to the accompanying drawings.

Figure 3:
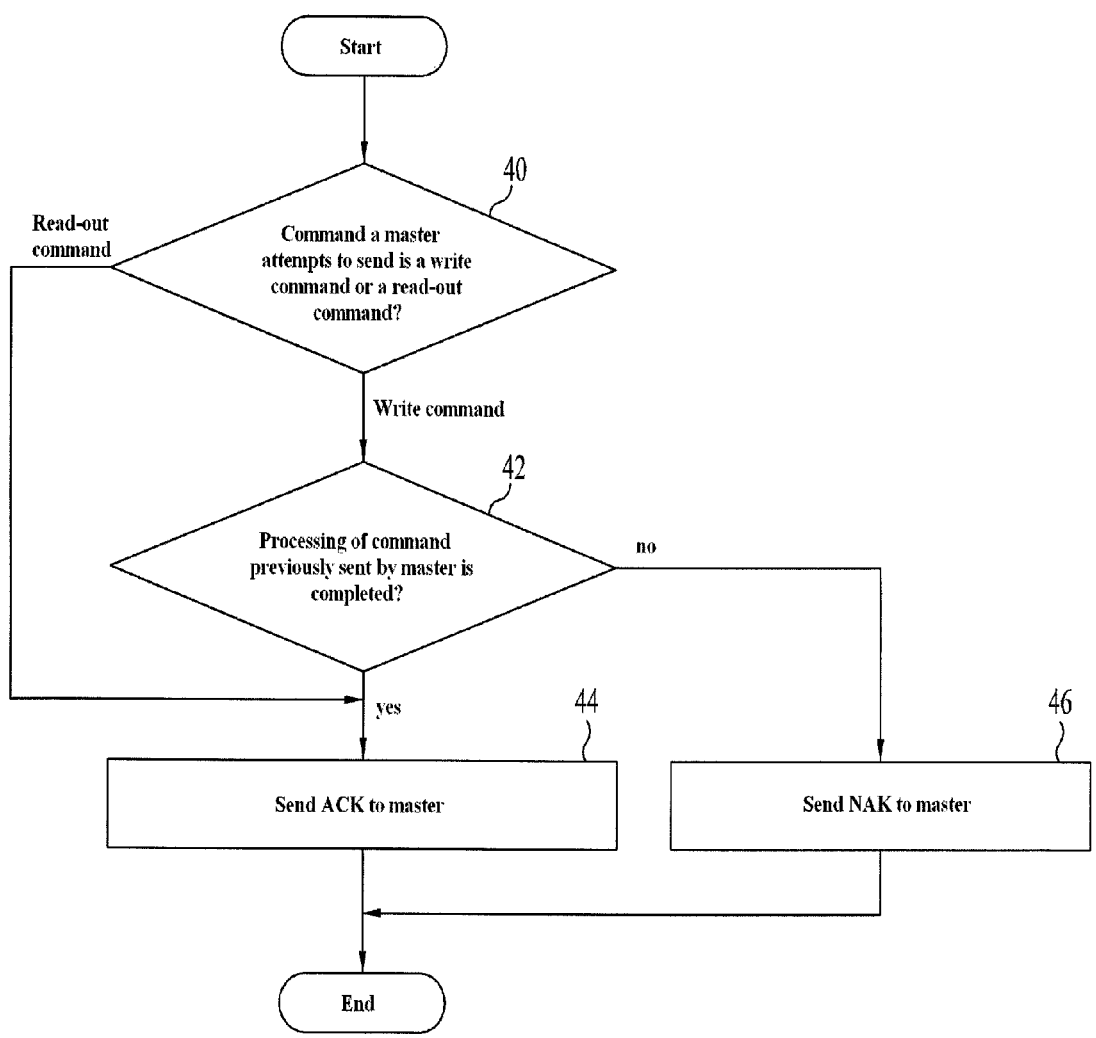

Example FIG. 3 is a flowchart for a communicating method between slave 20A and master 10 in accordance with embodiments.

As illustrated in example FIG. 3, if master 10 attempts to send a command, it is determined whether the command the master attempts to send to slave 20A is a write command or a read-out command [S40]. Step S40 can be performed by command type checking unit 26 illustrated in example FIG. 2.

Figure 4:
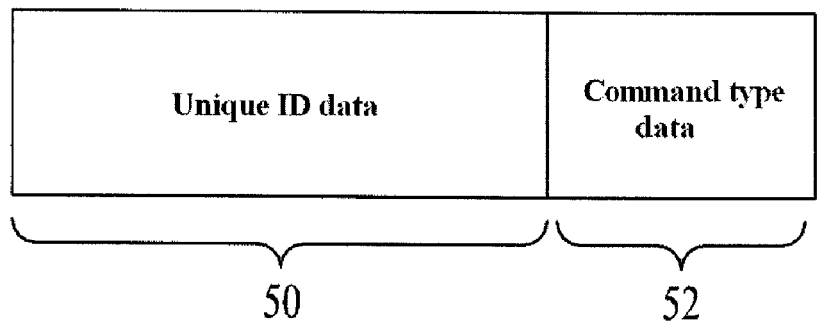

Example FIG. 4 is a diagram for a format of slave identification data in accordance with embodiments.

As illustrated in example FIG. 4, in order to perform step S40, command type checking unit 26 of slave 20A receives slave identification information transferred from master 10 via input terminal IN and is then able to determine whether a command master 10 attempts to send is a write command or a read-out command. For instance, the slave identification information, as illustrated in example FIG. 4, includes unique identification data 50 and command type data 52. Unique identification data 50 is the data uniquely given to each of slaves 20 illustrated in example FIG. 1 to identify slaves 20 individually.

Master 10 transfers the slave identification information to all slaves 20 illustrated in example FIG. 1. In this case, each of the slaves receives the slave identification information transferred from master 10 and then checks whether the unique identification data included in the received identification information is identical to the unique identification data granted to itself. If they are identical to each other, the corresponding slave 20 can be aware of being selected by master 10. Moreover, command type data 52 includes the data indicating whether the command master 10 attempts to send to slave 20 is the write command or the read-out command. For instance, if the command master 10 attempts to send is the write command, the command type data of 1 bit can be set to 1. If the command master 10 attempts to send is the read-out command, the command type data of 1 bit can be set to 0. Thus, slave 20, which is aware of being selected by master 10, is also able to recognize whether the command master 10 attempts to send currently is the write or read-out command through command type data 52.

If it is determined that the command master 10 attempts to send is the write command, slave 20A determines whether the processing of the command previously sent by master 10 is entirely completed [step S42]. In this case, step S42 is performed by command completion checking unit 28. In case of determining that the processing of the command previously sent by master 10 is entirely completed or determining that the command master 10 attempts to send is the read-out command, slave 20A sends an ACK signal enabling master 10 to send the command to master 10 [step S44]. In this case, step S44 can be performed by responding unit 30 illustrated in example FIG. 2. In particular, in case of confirming that the command master 10 currently attempts to send is the write command through the first check signal received from command type checking unit 26, responding unit 30 recognizes whether the processing of the previous command is completed through the second check signal and is then able to perform step S44. Moreover, in case of confirming that the command master 10 currently attempts to send is the read-out command through the first check signal received from command type checking unit 26, responding unit 30 sends an ACK signal to master 10 irrespective of the second check signal.

In this case, unlike a general slave, it can be observed that slave 20A in accordance with embodiments sends the ACK signal to master 10 if the command master 10 attempts to send is the read-out command, despite that slave 20A is still performing the processing of the previously send command. Yet, in case of determining that the command master 10 attempts to send is the write command and also determining that the processing of the previously sent command is in progress, i.e., the processing is not completed yet, slave 20A sends a NAK signal for not allowing master 10 to send the command to master 10 via the output terminal OUT. Master 10 sends a command to slave 20A in response to the ACK signal transferred from slave 20A. If the NAK signal is received from slave 20, master 10 can hold a command which is currently to be sent to slave 20. Thereafter, when the processing of the command previously sent by slave 20 is entirely completed, if an ACK signal is sent to master 10, master 10 sends a write command to slave 20.

Figure 5A:
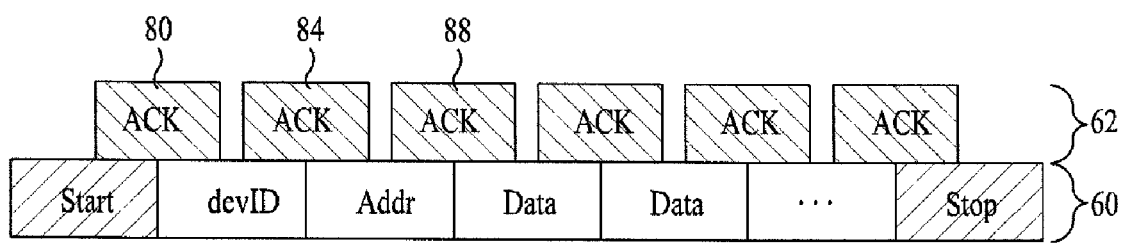
Figure 5B:
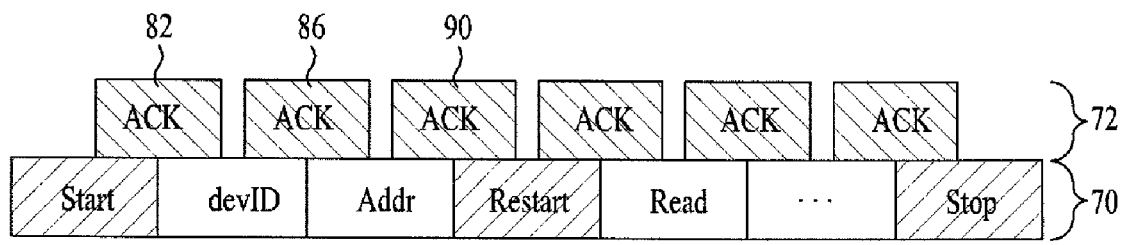

Example FIGS. 5A and 5B illustrate diagrams of the exchange of data between master 10 and slave 20 through I2C.

As illustrated in example FIG. 5A, master 10 sends a write command to slave 20. Slave 20 then stores data. In example FIG. 5A, 'devID' indicates the slave identification information illustrated in example FIG. 4. In example FIG. 5B, master 10 sends a read-out command to slave 20. Slave 20 then reads data.

As illustrated in example FIGS. 5A and 5B, if master 10 sends a start signal Start to slave 20, slave 20 sends ACK signal (ACK) 80, 82 for allowing a command to be sent to master 10. Having received ACK signal (ACK) 80, 82, master 10 sends devID to slave 20. In this case, slave 20 recognizes that it is selected by master 10 through the devID and also recognizes whether the command master 10 attempts to send is the write command or the read-out command through the devID. Slave 20 then sends ACK signal 84, 86 to master 10. Having received ACK signal 84, 86, master 10 sends a written or read-out address (Addr) to slave 20. In this case, slave 20 sends ACK signal 88, 90 for allowing master 10 to send the command to master 10. Thereafter, slave 20 writes the data transferred from master 10 in storage unit 22, as illustrated in example FIG. 5A, or reads out the data stored in storage unit 22, as illustrated in example FIG. 5B.

Thus, each time the ACK signal is transferred from slave 20, master 10 transfers the data to slave 20 or brings the data from slave 20. In this case, if master 10 sends a stop signal, the write or read-out operation of slave 20 is stopped. In particular, portion 62, 72 illustrated in example FIGS. 5A and 5B indicates a signal transferred the slave 20 to master 10, while portion 60, 70 indicates the signal and data transferred from master 10 to slave 20. Therefore, if the command previously sent by master 10 is still being processed, the general slave that generates ACK unconditionally irrespective of whether the command master 10 currently attempt to send is the write command or the read-out command.

On the contrary, if the command master 10 attempts to send is the read-out command, the slave 20 in accordance with embodiments is able to send the acknowledgement signal (ACK) to master 10 at the timing point of processing the command previously transferred from master 10.

In a slave and communicating method between a master and the same in accordance with embodiments, when the master attempts to send a command via a serial bus such as I2C, even if the processing of a previous command is not completed, embodiments enable the master to read out data stored in the slave. Moreover, embodiments enable the command processing not to be overlapped in a manner of checking whether an acknowledgment signal (ACK) is sent or not. Therefore, embodiments considerably reduce unnecessary codes of a host system, thereby simplifying control codes of devices that use such a serial bus communication protocol as I2C.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus comprising:
  a master;
  a slave in communication with the master, the slave including:
    a central processing unit configured to generate an acknowledgement signal (ACK) if the master attempts to send a command, the ACK allowing a transfer of the command in accordance with a result of checking whether the command to be transmitted is one of a write command and a read-out command and a result of checking whether a processing of a previous command previously sent by the master is entirely completed; and
    a storage unit configured to store one of a written data and read-out data under control of the central processing unit,
  wherein the master sends the command to the slave in response to the ACK signal transferred from the slave, and
  wherein the ACK siqnal is generated when the command to be transmitted is determined as the read-out command irrespective of whether or not the processing of the previous command previously sent by the master is determined as entirely completed.

2. The apparatus of claim 1, wherein the central processing unit comprises a command type checking unit configured to check whether the command to be sent is one of the write command and the read-out command.

3. The apparatus of claim 1, wherein the central processing unit sends the acknowledgement signal as a flag to the master.

4. The apparatus of claim 1, wherein the slave communicates with the master in accordance with a serial bus communication protocol.

5. An apparatus comprising:
  a master;
  a slave in communication with the master, the slave including:
    a central processing unit configured to generate an acknowledgement signal (ACK) if the master attempts to send a command, the ACK allowing a transfer of the command in accordance with a result of checking whether the command to be transmitted is one of a write command and a read-out command and a result of checking whether a processing of a previous command previously sent by the master is entirely completed; and
    a storage unit configured to store one of a written data and read-out data under control of the central processing unit,
  wherein the master sends the command to the slave in response to the acknowledgement signal transferred from the slave,
  wherein the central processing unit comprises a command type checking unit configured to check whether the command to be sent is one of the write command and the read-out command, and
  wherein the command type checking unit is configured to output a result of the checking as a first check signal.

6. The apparatus of claim 5, wherein the central processing unit comprises a command completion checking unit configured to check whether the processing of a previous command previously sent by the master is entirely completed in response to the first check signal.

7. The apparatus of claim 6, wherein the command completion checking unit is configured to output a result of the checking as a second check signal.

8. The apparatus of claim 7, wherein the central processing unit comprises a responding unit is configured to generate the ACK in response to at least one of the first check signal and the second check signal.

9. The apparatus of claim 8, wherein the responding unit is configured to send the acknowledgement signal to the master.

10. The apparatus of claim 9, wherein the responding unit is configured to generate a non-acknowledgement signal (NAK) signal for not allowing the transfer of the command in response to the first check signal and the second check signal and then sends the NAK to the master.

11. The apparatus of claim 10, wherein the central processing unit sends the non-acknowledgement signal as a flag to the master.

12. An apparatus comprising:
  a master;
  a slave in communication with the master, the slave including:
    a central processing unit configured to generate an acknowledgement signal (ACK) if the master attempts to send a command, the ACK allowing a transfer of the command in accordance with a result of checking whether the command to be transmitted is one of a write command and a read-out command and a result of checking whether a processing of a previous command previously sent by the master is entirely completed; and
    a storage unit configured to store one of a written data and read-out data under control of the central processing unit, wherein the master sends the command to the slave in response to the acknowledgement signal transferred from the slave, wherein the master and the slave are included in an image signal processor.

13. A communicating method between a slave and a master, the method comprising:

checking whether a command to be sent is one of a write command and a read-out command if the master attempts to send the command to the slave;

determining whether a processing of a previous command sent by the master is entirely completed if the command to be sent is the write command; and sending an acknowledgement signal that allows a transfer of the command to the master if the processing of the previously sent command is determined as one of entirely completed and the command to be sent is determined as the read-out command, wherein the master sends the command to the slave in response to the acknowledgement signal sent by the slave, and wherein the acknowledgement signal is sent to the master when the command to be sent is determined as the read-out command irrespective of whether or not the processing of the previously sent command is determined as entirely completed.

14. The method of claim 13, wherein slave identification information sent by the master is used to determine whether the command to be sent is one of the write command and the read-out command.

15. The method of claim 14, wherein the slave identification information comprises a unique identification data uniquely given for identification of each slave.

16. The method of claim 15, wherein the slave identification information comprises a command type data configured to indicate whether the command the master attempts to send is one of the write command and the read-out command.

17. The method of claim 13, further comprising sending a non-acknowledgement signal (NAK) for not allowing the transfer of the command to the master if the processing of the previously sent command is currently ongoing.

18. The method of claim 17, wherein the master holds the transfer of the command to the slave in response to the non-acknowledgement signal.

19. The method of claim 18, further comprising, after the non-acknowledgement signal has been sent while the processing of the previously sent command is ongoing, sending the acknowledgement signal to the master if the processing of the previously sent command is entirely completed.

20. The method of claim 13, wherein the slave communicates with the master in accordance with a serial bus communication protocol.

* * * * *